US008730532B2

(12) United States Patent
Lee

(10) Patent No.: US 8,730,532 B2
(45) Date of Patent: May 20, 2014

(54) AUTOMATIC DOCUMENT FEEDING SCANNING DEVICE

(71) Applicant: Primax Electronics Ltd., Taipei (TW)

(72) Inventor: Chun-Yu Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/760,962

(22) Filed: Feb. 6, 2013

(65) Prior Publication Data

US 2014/0092449 A1    Apr. 3, 2014

(30) Foreign Application Priority Data

Sep. 28, 2012   (TW) .............................. 101135808 A

(51) Int. Cl.
*H04N 1/04* (2006.01)
(52) U.S. Cl.
USPC ........... 358/474; 358/496; 358/497; 358/498; 358/486
(58) Field of Classification Search
CPC ....... H04N 1/193; H04N 1/12; H04N 1/0057; H04N 1/121; H04N 2201/00631; H04N 1/1017; H04N 1/1013; H04N 2201/1016
USPC ......... 358/474, 496, 497, 498, 486, 401, 501, 358/505; 399/367, 379, 211; 318/685, 696
See application file for complete search history.

(56) References Cited

U.S. PATENT DOCUMENTS

| | | | | |
|---|---|---|---|---|
| 5,226,639 | A | * | 7/1993 | Kida et al. .................... 271/109 |
| 5,523,858 | A | * | 6/1996 | Yamada et al. ............... 358/412 |
| 5,854,696 | A | * | 12/1998 | Yun .............................. 358/498 |
| 5,862,446 | A | * | 1/1999 | Hashizume et al. .......... 399/367 |
| 6,019,363 | A | * | 2/2000 | Ahn ........................... 271/10.05 |
| 6,948,871 | B1 | * | 9/2005 | Onishi et al. .................. 400/679 |
| 6,982,815 | B2 | * | 1/2006 | Tsutsumi ...................... 358/474 |
| 7,123,386 | B2 | * | 10/2006 | Tanaka et al. ................. 358/474 |
| 7,466,461 | B2 | * | 12/2008 | Chen et al. .................... 358/474 |
| 7,869,105 | B2 | * | 1/2011 | Ikeda ............................ 358/498 |
| 2013/0329265 | A1 | * | 12/2013 | Miyamoto .................... 358/496 |

* cited by examiner

*Primary Examiner* — Cheukfan Lee
(74) *Attorney, Agent, or Firm* — Kirton McConkie; Evan R. Witt

(57) ABSTRACT

The present invention discloses an automatic document feeding scanning device including an automatic document feeder, a flatbed scanner and a power switching mechanism. The automatic document feeder has a pickup arm and a feeding gear, the flatbed scanner has a scanning module and a scanning gear, and the power switching mechanism has two driving elements and a planet gear module. When the two driving elements rotate in the same rotating direction, the planet gear module is swung to a position near the scanning gear and engaged with the scanning gear such that the power switching mechanism transfers a driving power to the automatic document feeder. When the two driving elements rotate in different rotating directions, the planet gear module is swung to a position near the feeding gear and engaged with the feeding gear such that the power switching mechanism transfers a driving power to the flatbed scanner.

17 Claims, 11 Drawing Sheets

AUTOMATIC DOCUMENT FEEDING SCANNING DEVICE

FIELD OF THE INVENTION

The present invention generally relates to a scanning device, and more particularly to an automatic document feeding scanning device with an automatic document feeder and a flatbed scanner.

BACKGROUND OF THE INVENTION

With the development of science and technology, the preservation manner for the document has evolved from filing a traditional paper document into saving a document as an electronic file, and a scanning device is an implement popularly utilized for document digitization, wherein the scanning device is capable of transforming the content of a paper document into an electronic file, which is more convenient to a user to disseminate, collect or save, by scanning.

The flatbed scanner, which is a kind of early scanning device, can only be used for scanning a single document every time as it is operated, and thus it is necessary to replace the single document onto the scanning platform. In another word, when the user desires to scan a plurality of documents as a plurality of images, it is necessary to repeatedly and manually replace the single document located on the scanning platform one by one until all of the plurality of documents is scanned. Since it is inconvenient to manually replace the document, an automatic document feeder has been developed and commercially available, which can be assembled with the flatbed scanner to form an automatic document feeding scanning device. Hence, it is capable of automatically feeding and scanning a plurality of documents one by one until all of the plurality of documents is scanned without manually replacing the plurality of documents.

The detail structure and the actual operation process of a conventional automatic document feeding scanning device are illustrated hereinafter. FIG. 1 illustrates a cross-sectional structural schematic side view of a conventional automatic document feeding scanning device. Referring to FIG. 1, the conventional automatic document feeding scanning device 1 comprises an automatic document feeder 10 and a flatbed scanner 11, wherein the automatic document feeder 10 comprises an inlet tray 101, an outlet tray 102, a pickup arm 103, a top cover 104, a feeding path 105, a plurality of feeding roller sets 106 and an outlet roller set 107. The flatbed scanner 11 is disposed under the automatic document feeder 10, which comprises a scanning module 111, a transmission roller set 112, a transmission belt 113, a scanning window 114 and a scanning platform 115.

In the automatic document feeder 10, the inlet tray 101 is capable of receiving at least one document S desired to be scanned, while the outlet tray 102 is located under the inlet tray 101, which is capable of receiving at least one document already scanned. The pickup arm 103 is located under the top cover 104 and located at an end of the feeding path 105, which can be swung relative to the top cover 104 and feed the document located on the inlet tray 101 into the feeding path 105. The feeding path 105 passes through the scanning window 114 of the flatbed scanner 11, which is capable of enabling the document to be transmitted through and toward the scanning window 114. The plurality of feeding roller sets 106 is disposed on the feeding path 105, and capable of feeding the document, so as to enable the document to be moved within the feeding path 105. The outlet roller set 107 is located at another end of the feeding path 105, wherein the document already transmitted through the scanning window 114 is capable of being fed toward the outlet tray 102 by the outlet roller set 107.

In the flatbed scanner 11, the transmission roller set 112 and the transmission belt 113 are both disposed under the scanning window 114 and the scanning platform 115. In addition, the transmission roller set 112 connects with the transmission belt 113, while the transmission belt connects with the scanning module 111. When the transmission roller set 112 is driven to rotate, the transmission roller set 112 brings the transmission belt 113 to rotate, so as to enable the transmission belt 113 to bring the scanning module 111 to move. When the user separately uses the flatbed scanner 11, it is necessary to put the document on the scanning platform 115 first. Afterwards, both of the transmission roller set 112 and the transmission belt 113 are operated and thus brings the scanning module 111 to move toward the right side of FIG. 1, so as to enable the scanning module 111 to be moved to a position under the scanning platform 115 and to be moved along the scanning platform 115, and thus to scan the document located on the scanning platform 115. After the scan is complete, both of the transmission roller set 112 and the transmission belt 113 are operated and thus brings the scanning module 111 to move toward the left side of FIG. 1 till the scanning module 111 is moved back to an initial position of the scanning module 111, i.e. the scanning module 111 is returned. The above mentioned description is about the actual operation process of the conventional flatbed scanner 11.

The actual operation process of the automatic document feeder 10 accompanied with the flatbed scanner 11 is illustrated hereinafter. As illustrated in FIG. 1, before the automatic document feeder 10 is operated, the pickup arm 103 thereof is located at a position near the top cover 104, so as to enable the user to put a plurality of documents on the inlet tray 101, and an end of the plurality of documents is located under the pickup arm 103. FIG. 2 illustrates a cross-sectional structural schematic side view of an automatic document feeder of a conventional automatic document feeding scanning device, wherein the automatic document feeder is operating. Referring to FIG. 2, when the automatic document feeder 10 is operated, the pickup arm 103 thereof is driven and thus swung relative to the top cover 104, and the pickup arm 103 is swung to a position to contact with the plurality of documents S, so as to feed one document of the plurality of documents S into the feeding path 105. Next, the document fed into the feeding path 105 is fed to the scanning window 114 by the plurality of feeding roller sets 106, and the scanning module 111 moved to the position under the scanning window 114 scans the document transmitted through the feeding path 105 via the scanning window. At this moment, both of the transmission roller set 112 and the transmission belt 113 are not operated, and the scanning module 111 is not moved. After whole of the document is completely scanned by the scanning module 111 and then fed to leave the scanning window 114, a next document of the plurality of documents S is subsequently fed into the feeding path 105 by the foregoing operation process as well, and then the scanned document is fed onto the outlet tray 102 by the outlet roller set 107. After all of the plurality of documents S is completely scanned and fed onto the outlet tray 102, the user can take the plurality of documents S out from the outlet tray 102. In addition, both of the transmission roller set 112 and the transmission belt 113 are operated, so as to enable the scanning module 111 to be returned, and then the scan of the plurality of documents S is completed.

According to the foregoing description, it is obvious to understood that, in order to separately obtain the driving power for achieving the foregoing feeding function and the foregoing scanning function, the automatic document feeder 10 and the flatbed scanner 11 should be respectively connected with different driving elements (not shown) during the automatic document feeding scanning device 1 operating. Generally speaking, there are two driving elements disposed within the automatic document feeder 10, wherein one of them connects with the pickup arm 103 for taking out the document, and the other one of them connects with the feeding roller set 106 for feeding the document. In addition, there is another driving element disposed within the flatbed scanner 11, which connects with the transmission roller set 112 for moving the scanning module 111. However, it is not only much expensive to disposed three driving elements within the automatic document feeding scanning device, but also consuming more electricity by using three driving elements. In addition, there should be designed with a larger space in the automatic document feeding scanning device for containing the plurality of driving elements therein, and thus the total volume of the automatic document feeding scanning device is unavoidably increased. As a result, it is desired to provide an automatic document feeding scanning device, wherein a number of the driving element disposed therein can be decreased.

SUMMARY OF THE INVENTION

The present invention is directed to providing an automatic document feeding scanning device, wherein a number of a plurality of driving elements disposed therein can be decreased.

In a preferred embodiment, the present invention provides an automatic document feeding scanning device capable of scanning a document, wherein the automatic document feeding scanning device comprises:

an automatic document feeder, capable of feeding the document, wherein the automatic document feeder has a feeding gear;

a flatbed scanner, disposed under the automatic document feeder, and capable of scanning the document, wherein the flatbed scanner has a scanning gear; and a power switching mechanism, disposed at a position near the automatic document feeder and the flatbed scanner, and capable of transmitting a first driving power to the automatic document feeder or transmitting the first driving power to the flatbed scanner, wherein the power switching mechanism comprises:

a first driving module, capable of providing the first driving power and outputting the first driving power, wherein the first driving module comprises a first driving element capable of rotating and thus providing the first driving power;

a planet gear module, connecting with the first driving module, and capable of engaging with the feeding gear and thus transmitting the first driving power to the automatic document feeder, or engaging with the scanning gear and thus transmitting the first driving power to the flatbed scanner;

a swinging module, near the planet gear module, and capable of assisting the planet gear module in being swung toward the feeding gear or being swung toward the scanning gear when the swinging module contacts with the planet gear module; and a second driving module, connecting with the swinging module, capable of transmitting a second driving power to the swinging module, so as to enable the swinging module to contact with the planet gear module, and the second driving module comprises a second driving element capable of rotating and thus providing the second driving power; wherein the planet gear module is swung toward the scanning gear and engages with the scanning gear when the first driving element rotates along a first rotating direction and the second driving element rotates along the first rotating direction; while the planet gear module is swung toward the feeding gear and engages with the feeding gear when the first driving element rotates along a second rotating direction opposite to the first rotating direction and the second driving element rotates along the first rotating direction.

In a preferred embodiment, the first driving module further comprises:

a first driving gear, connecting with the first driving element, and capable of transmitting the first driving power coming from the first driving element; and a first transmitting gear, engaging with the first driving gear, connecting with the planet gear module, and capable of transmitting the first driving power to the planet gear module; wherein the first driving gear rotates along the first rotating direction with the first driving element and the first transmitting gear rotates along the second rotating direction when the first driving element rotates along the first rotating direction; while the first driving gear rotates along the second rotating direction with the first driving element and the first transmitting gear rotates along the first rotating direction when the first driving element rotates along the second rotating direction.

In a preferred embodiment, the automatic document feeder further comprises a pickup arm, a top cover and at least one feeding roller set, the pickup arm connects with the feeding gear and capable of being driven by the first driving module, so as to enable the pickup arm to feed the document into the automatic document feeder or to be swung relative to the top cover, the top cover is disposed over the pickup arm, while the at least one feeding roller set connects with the second driving module and capable of being driven by the second driving module, so as to feed the document to be moved within the automatic document feeder, the flatbed scanner further comprises a scanning module, the scanning module connects with the scanning gear and capable of being driven by the first driving module, so as to enable the scanning module to move and to scan the document; the pickup arm feeds the document into the automatic document feeder when the planet gear module engages with the feeding gear and the first driving element rotates along the first rotating direction; while the pickup arm is swung toward the top cover when the planet gear module engages with the feeding gear and the first driving element rotates along the second rotating direction; the scanning module moves away from the scanning gear and scans the document when the planet gear module engages with the scanning gear and the first driving element rotates along the first rotating direction; while the scanning module moves close to the scanning gear when the planet gear module engages with the scanning gear and the first driving element rotates along the second rotating direction.

In a preferred embodiment, the pickup arm further comprises a first transmission shaft connecting with the feeding gear, so as to enable the first driving power to be transmitted to the pickup arm via the feeding gear and the first transmission shaft.

In a preferred embodiment, the flatbed scanner further comprises:

a first bevel gear, connecting with the scanning gear and synchronously rotating with the scanning gear;

a second bevel gear, engaging with the first bevel gear and brought to rotate by the first bevel gear; and a transmission belt, connecting with the second bevel gear and the scanning module, and capable of being brought to move the scanning module by the first bevel gear.

In a preferred embodiment, the planet gear module comprises:

a swinging rod, connecting with a rotating shaft of the first transmitting gear and capable of being swung relative to the rotating shaft;

a sun gear, fitting onto the rotating shaft and located at a side of the swinging rod, and capable of synchronously rotating with the rotating shaft;

a first planet gear, disposed on the swinging rod and located at a side of the sun gear, so as to engage with the sun gear, capable of engaging with the scanning gear or engaging with the feeding gear, and brought to transmit the first driving power to the scanning gear or the feeding gear by the sun gear; and a second planet gear, disposed on a second end of the swinging rod and located at another side of the sun gear, so as to engage with the sun gear, capable of contacting with the swinging module, and brought to enable the swinging rod to be swung toward the feeding gear or to be swung toward the scanning gear by the sun gear.

In a preferred embodiment, the planet gear module comprises:

a swinging rod, connecting with the first driving module and capable of being swung relative to the first driving module;

a sun gear, connecting with first driving module and located at a side of the swinging rod, and capable of being rotated in response to the first driving power;

a first planet gear, disposed on the swinging rod and located at a side of the sun gear, so as to engage with the sun gear, capable of engaging with the scanning gear or engaging with the feeding gear, and brought to transmit the first driving power to the scanning gear or the feeding gear by the sun gear; and a second planet gear, disposed on a second end of the swinging rod and located at another side of the sun gear, so as to engage with the sun gear, capable of contacting with the swinging module, and brought to enable the swinging rod to be swung toward the feeding gear or to be swung toward the scanning gear by the sun gear.

In a preferred embodiment, the power switching mechanism further comprises a holding module disposed at a position near the swinging rod and contacting with a first end of the swinging rod, and the holding module comprises:

a holding rod, capable of contacting with the swinging rod and holding the first end of the swinging rod therein, wherein the holding rod has a first notch and a second notch located under the first notch, the first planet gear is kept engaging with the feeding gear when the first end of the swinging rod inserts into the first notch and is held therein, while the first planet gear is kept engaging with the scanning gear when the first end of the swinging rod inserts into the second notch and is held therein; and a first elastic element, connecting with the holding rod, and capable of providing a first elastic force to the holding rod, so as to enable the holding rod to be returned.

In a preferred embodiment, the swinging rod is swung toward the scanning gear relative to the first driving module and the first end of the swinging rod pushes the holding rod and is away from the first notch when the first driving element rotates along the first rotating direction and the second driving element rotates along the second rotating direction; while the swinging rod is swung toward the feeding gear relative to the first driving module and the first end of the swinging rod pushes the holding rod and is away from the second notch when the first driving element rotates along the second rotating direction and the second driving element rotates along the second rotating direction.

In a preferred embodiment, the second driving module further comprises:

a second driving gear, connecting with the second driving element, and capable of transmitting the second driving power coming from the second driving element;

a second transmitting gear, engaging with the second driving gear, and capable of outputting the second driving power to the swinging module;

a second rotating shaft, adjacent to the swinging module, and connecting with the second transmitting gear, so as to synchronously rotate with the second transmitting gear; and a second elastic element, fitting onto the second rotating shaft and contacting with the swinging module, and capable of providing a second elastic force to the swinging module in response to the second driving power, so as to enable the swinging module to be pushed and thus to contact with the planet gear module.

In a preferred embodiment, the swinging module comprises:

a shifting wedge, near the second driving module and contacting with the second driving module, and capable of being pushed to move by the second driving module;

an auxiliary post, near the shifting wedge, and capable of being pushed to contact with the planet gear module by the shifting wedge being moved, wherein the auxiliary post has a plurality of sawtooth structures capable of engaging with a second planet gear of the planet gear module; and a third elastic element, connecting with the auxiliary post, and capable of providing a third elastic force to the auxiliary post, so as to enable the auxiliary post to be returned to push the shifting wedge, and thus the shifting wedge is returned.

In a preferred embodiment, the present invention further provides an automatic document feeding scanning device capable of scanning a document, wherein the automatic document feeding scanning device comprises:

an automatic document feeder, capable of feeding the document, wherein the automatic document feeder has a feeding gear;

a flatbed scanner, disposed under the automatic document feeder, and capable of scanning the document, wherein the flatbed scanner has a scanning gear; and a power switching mechanism, disposed at a position near the automatic document feeder and the flatbed scanner, and capable of transmitting a first driving power to the automatic document feeder or transmitting the first driving power to the flatbed scanner, wherein the power switching mechanism comprises:

a first driving module, capable of providing the first driving power and outputting the first driving power, wherein the first driving module comprises a first driving element capable of rotating and thus providing the first driving power;

a planet gear module, connecting with the first driving module, and capable of engaging with the feeding gear and thus transmitting the first driving power to the automatic document feeder, or engaging with the scanning gear and thus transmitting the first driving power to the flatbed scanner;

a swinging module, near the planet gear module, and capable of assisting the planet gear module in being swung toward the feeding gear or being swung toward the scanning gear when the swinging module contacts with the planet gear module; and a second driving module, connecting with the swinging module, capable of transmitting a second driving power to the swinging module, so as to enable the swinging module to contact with the planet gear module, and the second driving module comprises a second driving element capable of rotating and thus providing the second driving power; wherein the planet gear module is swung toward the scanning gear and engages with the scanning gear when the first driving element rotates along a first rotating direction and the second driving element rotates along a second rotating direction opposite to the first rotating direction; while the planet gear module is swung toward the feeding gear and engages with the feeding gear when the first driving element rotates along the second rotating direction and the second driving element rotates along the second rotating direction.

In a preferred embodiment, the first driving module further comprises a first driving gear connecting with the first driving element, and capable of transmitting the first driving power coming from the first driving element; wherein the first driving gear rotates along the first rotating direction with the first driving element when the first driving element rotates along the first rotating direction; while the first driving gear rotates along the second rotating direction with the first driving element when the first driving element rotates along the second rotating direction.

In a preferred embodiment, the planet gear module comprises:

a swinging rod, connecting with the driving module and capable of being swung relative to the first driving module;

a sun gear, connecting with the first driving module and located at a side of the swinging rod, and capable of rotating in response to the first driving power;

a first planet gear, disposed on the swinging rod and located at a side of the sun gear, so as to engage with the sun gear, capable of engaging with the scanning gear or engaging with the feeding gear, and brought to transmit the first driving power to the scanning gear or the feeding gear by the sun gear; and a second planet gear, disposed on a second end of the swinging rod and located at another side of the sun gear, so as to engage with the sun gear, capable of contacting with the swinging module, and brought to enable the swinging rod to be swung toward the feeding gear or to be swung toward the scanning gear by the sun gear.

In a preferred embodiment, the power switching mechanism further comprises a holding module disposed at a position near the swinging rod and contacting with a first end of the swinging rod, and the holding module comprises:

a holding rod, capable of contacting with the swinging rod and holding the first end of the swinging rod therein, wherein the holding rod has a first notch and a second notch located under the first notch, the first planet gear is kept engaging with the feeding gear when the first end of the swinging rod inserts into the first notch and is held therein, while the first planet gear is kept engaging with the scanning gear when the first end of the swinging rod inserts into the second notch and is held therein; and a first elastic element, connecting with the holding rod, and capable of providing a first elastic force to the holding rod, so as to enable the holding rod to be returned.

In a preferred embodiment, the second driving module further comprises:

a second driving gear, connecting with the second driving element, and capable of transmitting the second driving power coming from the second driving element;

a second rotating shaft, adjacent to the swinging module, and connecting with the second driving gear, so as to synchronously rotate with the second driving gear; and a second elastic element, fitting onto the second rotating shaft and contacting with the swinging module, and capable of providing a second elastic force to the swinging module in response to the second driving power, so as to enable the swinging module to be pushed and thus to contact with the planet gear module.

In a preferred embodiment, the swinging module comprises:

a shifting wedge, near the second driving module and contacting with the second driving module, and capable of being pushed to move by the second driving module;

an auxiliary post, near the shifting wedge, and capable of being pushed to contact with the planet gear module by the shifting wedge being moved, wherein the auxiliary post has a plurality of sawtooth structures capable of engaging with a second planet gear of the planet gear module; and a third elastic element, connecting with the auxiliary post, and capable of providing a third elastic force to the auxiliary post, so as to enable the auxiliary post to be returned to push the shifting wedge, and thus the shifting wedge is returned.

DETAILED DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1:
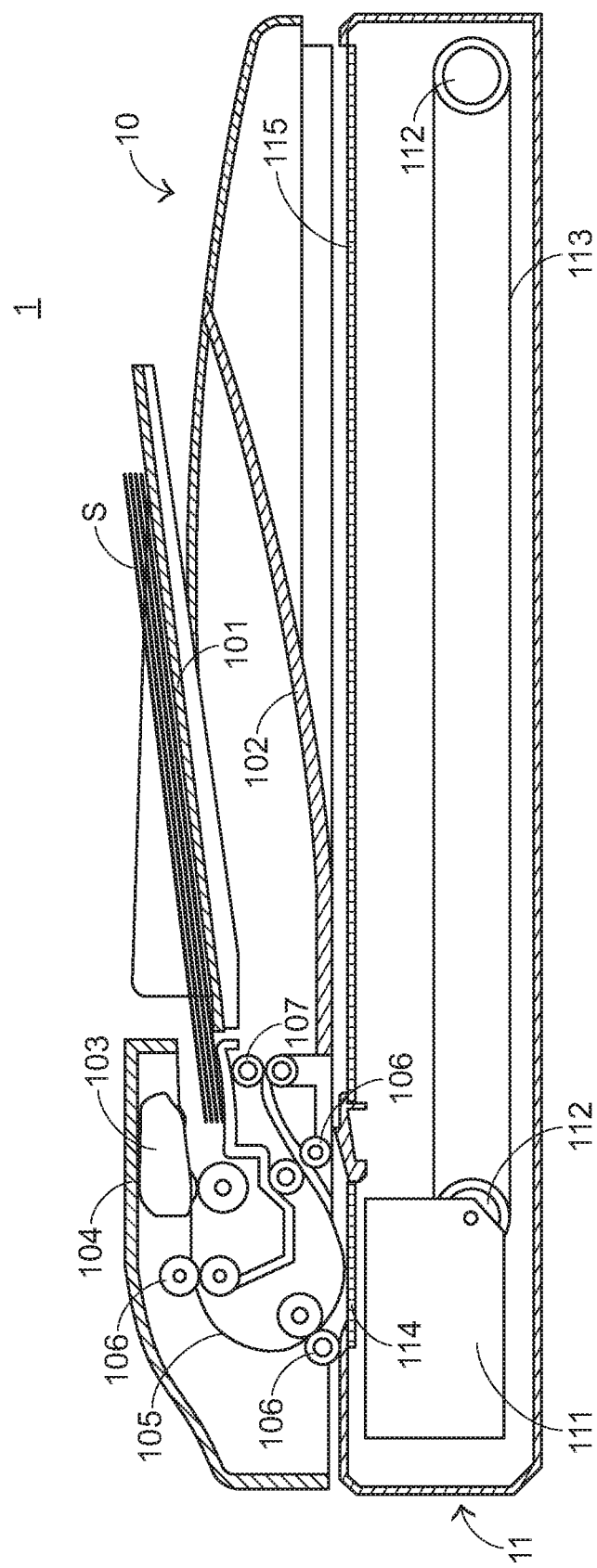
FIG. 1 illustrates a cross-sectional structural schematic side view of a conventional automatic document feeding scanning device.
Figure 2:
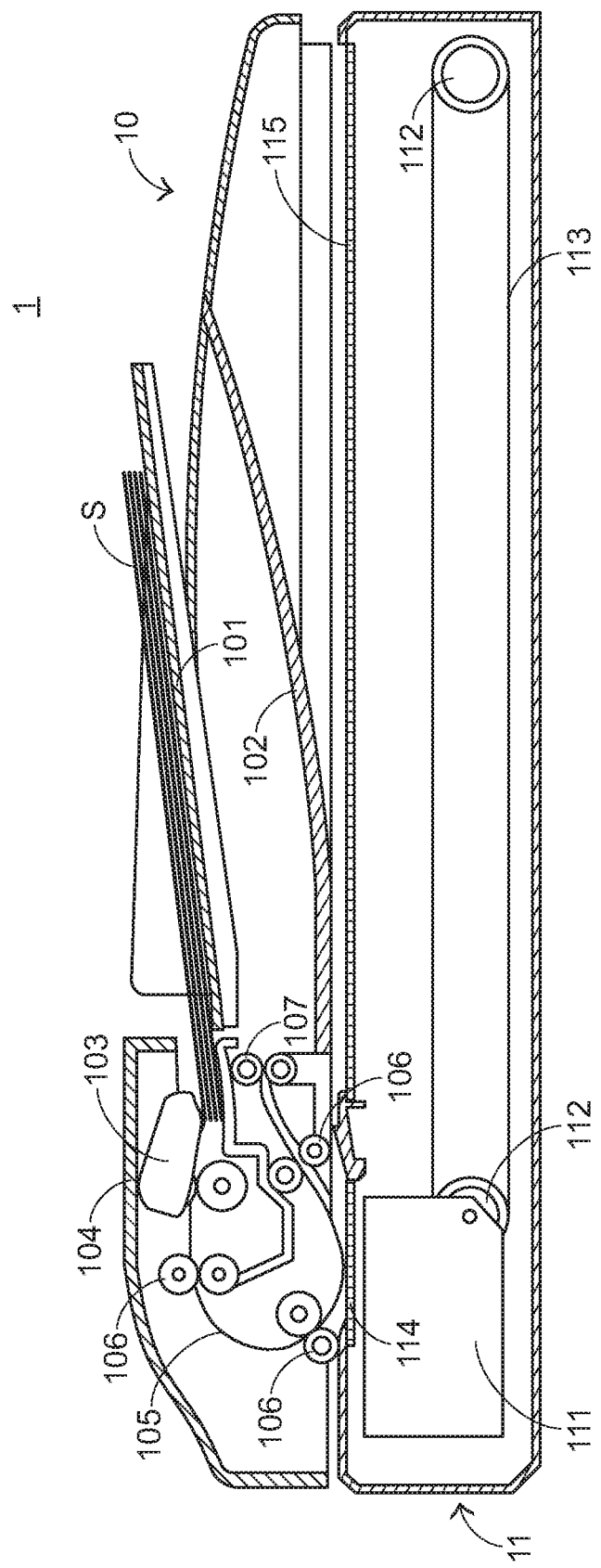
FIG. 2 illustrates a cross-sectional structural schematic side view of an automatic document feeder of a conventional automatic document feeding scanning device, wherein the automatic document feeder is operating.
Figure 3:
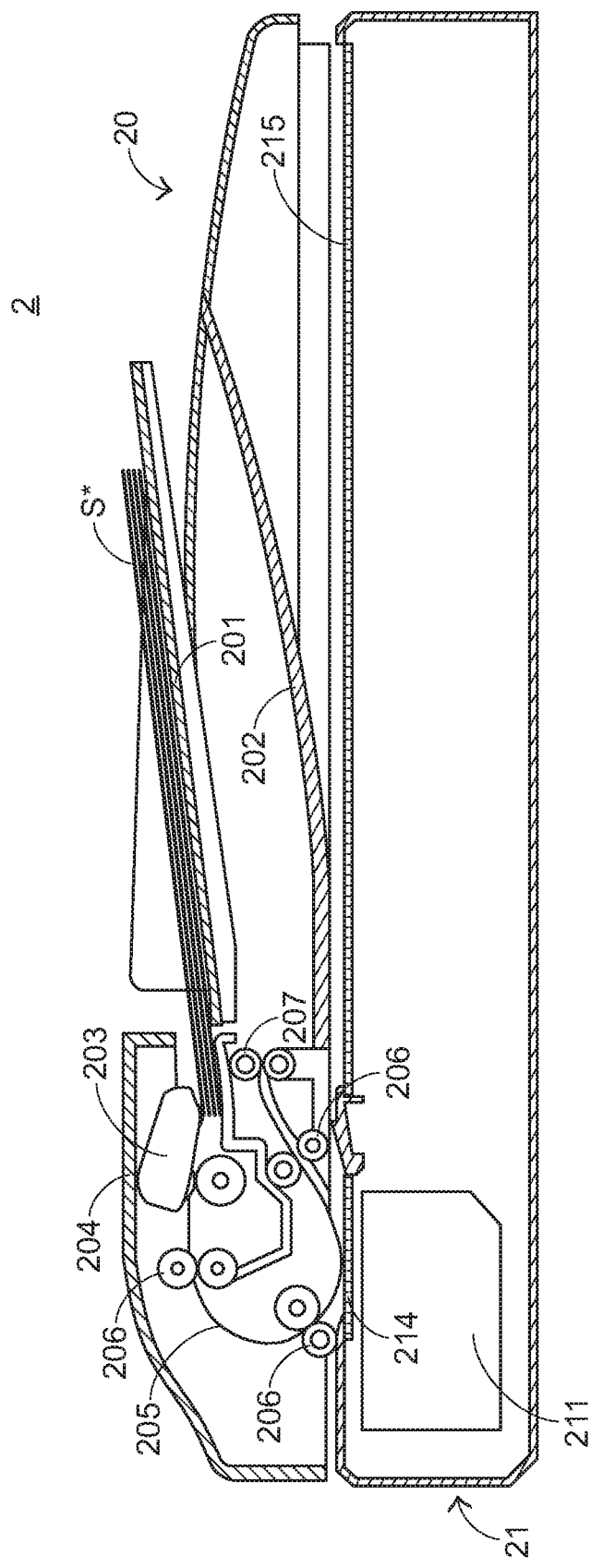
FIG. 3 illustrates a cross-sectional structural schematic side view of an automatic document feeding scanning device according to a first preferred embodiment of the present invention.
Figure 4:
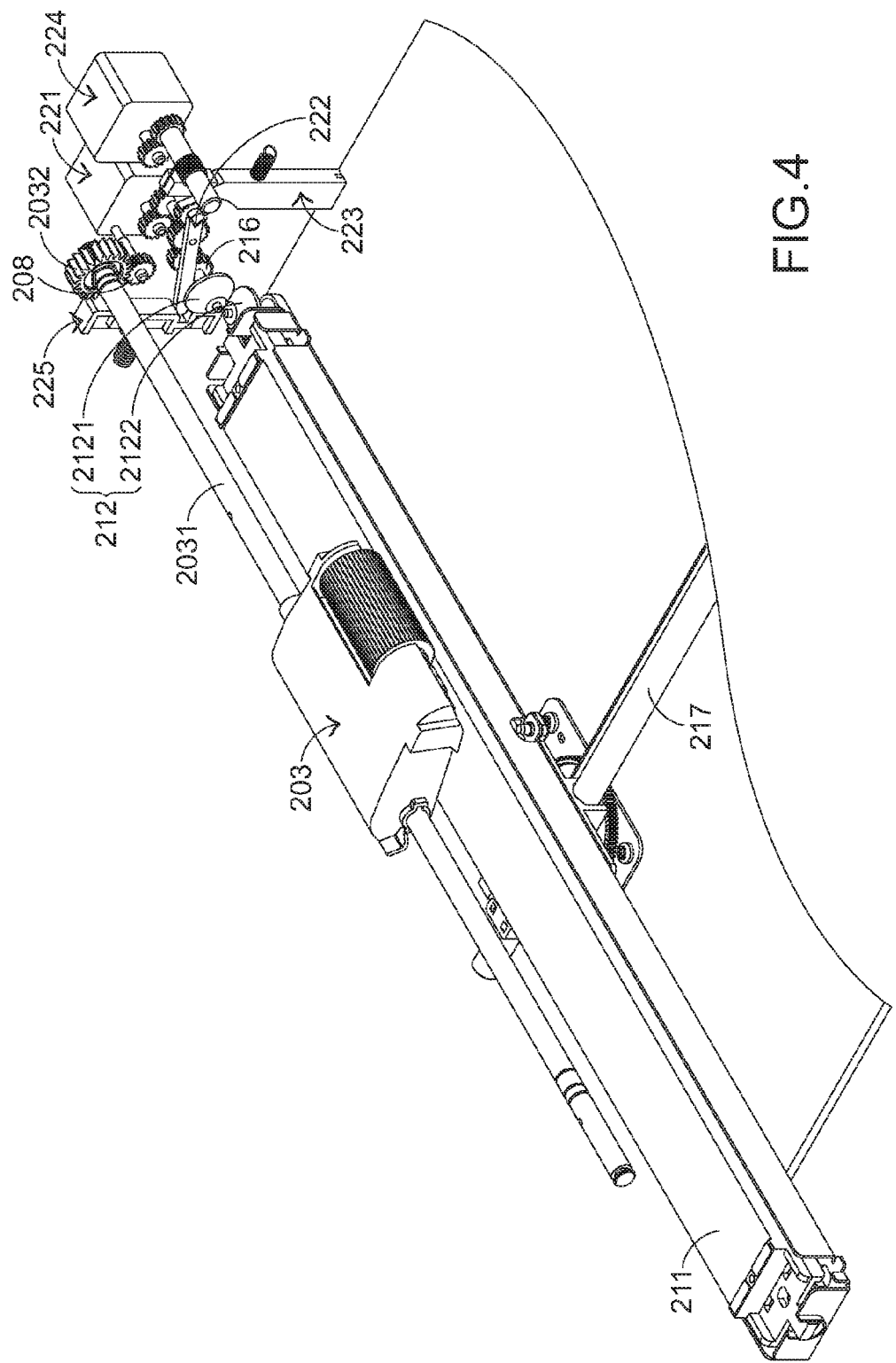
FIG. 4 illustrates a partial structural schematic side view of an automatic document feeding scanning device according to a first preferred embodiment of the present invention.

The present invention provides an automatic document feeding scanning device, which is capable of providing driving power to the automatic document feeder and the flatbed scanner respectively. FIG. 3 illustrates a cross-sectional structural schematic side view of an automatic document feeding scanning device according to a first preferred embodiment of the present invention. The automatic document feeding scanning device 2 is capable of scanning a document S*, which comprises an automatic document feeder 20, a flatbed scanner 21 and a power switching mechanism 22 (as shown in FIG. 4). The automatic document feeder 20 is capable of feeding the document S*, which comprises an inlet tray 201, an outlet tray 202, a pickup arm 203, a top cover 204, a feeding path 205, a plurality of feeding roller sets 206, an outlet roller set 207 and a feeding gear 208 (as shown in FIG. 4). The flatbed scanner 21 is disposed under the automatic document feeder 20 and capable of scanning the document S*, which comprises a scanning module 211, a transmission gear set 212, a transmission belt 213, a scanning window 214, a scanning platform 215, a scanning gear 216 (as shown in FIG. 4) and a moving shaft 217. Some of the detail structures and the actual operation processes of the automatic document feeder 20 and the flatbed scanner 21 are substantially similar to those of the prior art and thus are omitted herein, while those different from the conventional automatic document feeding scanning device 1 will be illustrated later in detail.

Figure 5:
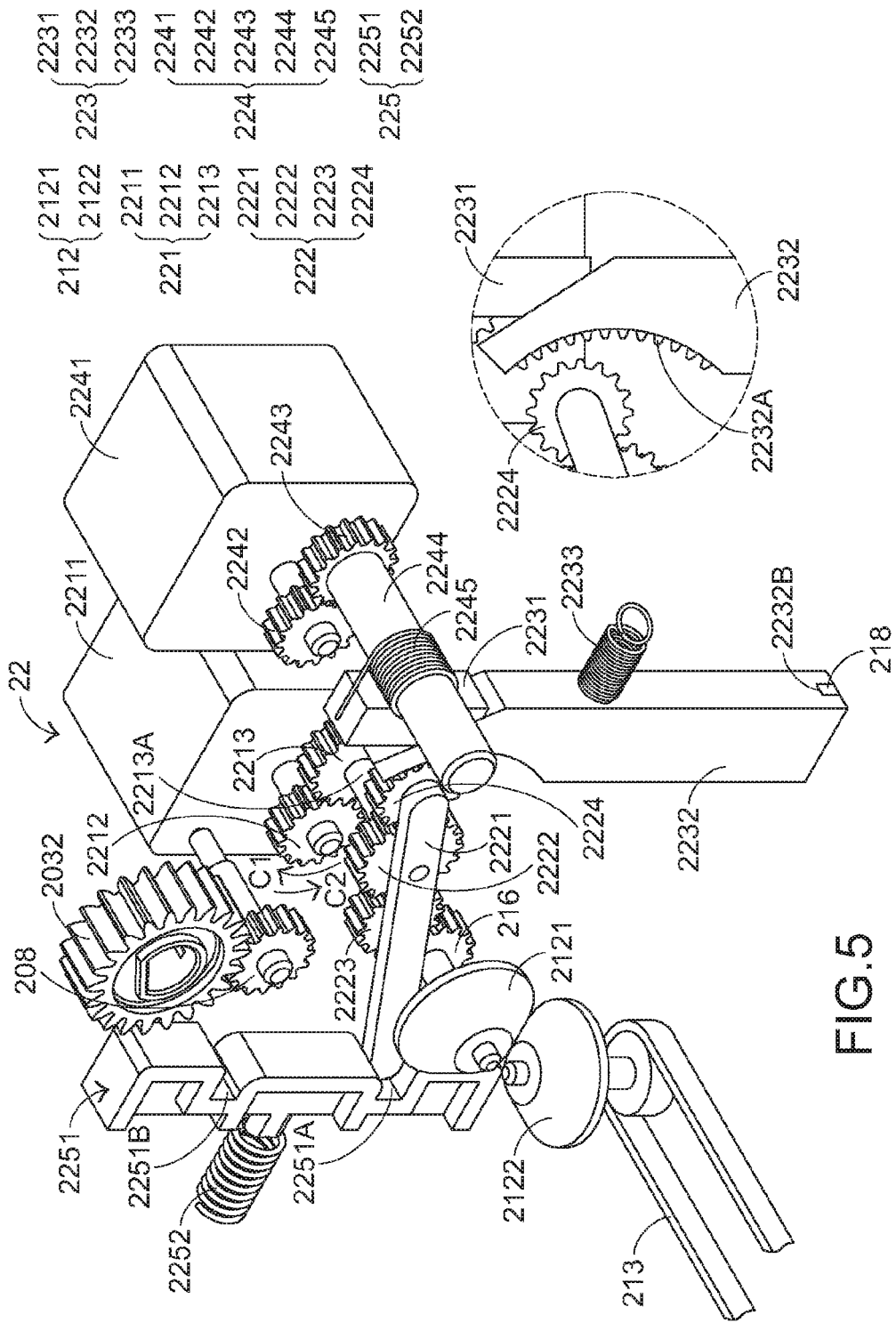
FIG. 5 illustrates a structural schematic view of a power switching mechanism of an automatic document feeding scanning device according to a first preferred embodiment of the present invention, wherein the power switching mechanism is transmitting a first driving power to a flatbed scanner.

FIG. 4 illustrates a partial structural schematic side view of an automatic document feeding scanning device according to a first preferred embodiment of the present invention, while FIG. 5 illustrates a structural schematic view of a power switching mechanism of an automatic document feeding scanning device according to a first preferred embodiment of the present invention, wherein the power switching mechanism is transmitting a first driving power to a flatbed scanner. Next, referring to FIG. 4 and FIG. 5 together hereinafter, the power switching mechanism 22 is disposed at a position near the automatic document feeder 20 and the flatbed scanner 21, and capable of transmitting a first driving power to the automatic document feeder 20, or transmitting the first driving power to the flatbed scanner 21. The power switching mechanism 22 comprises a driving module 221, a planet gear module 222, a swinging module 223, a second driving module 224 and a holding module 225. The driving module 221 is capable of providing the first driving power and outputting the driving power to the planet gear module 222. The planet gear module 222 connects with the driving module 221, and capable of engaging with the feeding gear 208 and thus transmitting the first driving power to the automatic document feeder 20, or engaging with the scanning gear 216 and thus transmitting the first driving power to the flatbed scanner 21. The swinging module 223 is located near the planet gear module 222, and capable of assisting the planet gear module 222 in being swung toward the feeding gear 208 or being swung toward the scanning gear 216 in response to the fist driving power when the swinging module 223 contacts with the planet gear module 222.

The second driving module 224 connects with one feeding roller set 206 of the plurality of feeding roller sets 206 and the swinging module 223. In order to clearly show the power switching mechanism 22 in the drawing, the second driving module 224 shown in FIG. 4 merely connects with the swinging module 223 but does not connects with the feeding roller set 206, wherein the second driving module 224 connects with the feeding roller set 206 via a gear set (not shown). The second driving module 224 is capable of transmitting a second driving power to the feeding roller set 206 and the swinging module 223, so as to enable the swinging module 223 to contact with the planet gear module 222, and enable the feeding roller set 206 to operate for transmitting the document S* within the feeding path 205 as well. The holding module 225 is disposed at a position near the planet gear module 222 and contacts with the planet gear module 222. The holding module 225 is capable of holding the planet gear module 222 when the planet gear module 222 engages with the feeding gear 208, so as to enable the planet gear module 222 not to be swung and kept engaging with the feeding gear 208, or holding the planet gear module 222 when the planet gear module 222 engages with the scanning gear 216, so as to enable the planet gear module 222 not to be swung and kept engaging with the scanning gear 216.

As illustrated in FIG. 4, the feeding gear 208 connects with the pickup arm 203 and is capable of being driven, so as to enable the pickup arm 203 to feed the document S* into the feeding path 205 of the automatic document feeder 20 or to be swung relative to the top cover 204, and the top cover 204 is disposed over the pickup arm 203. The pickup arm 203 comprises a first transmission shaft 2031 and a connecting gear 2032, wherein the first transmission shaft 2031 connects with the connecting gear 2032, and the connecting gear 2032 engages with the feeding gear 208, so as to enable the driving power to be transmitted to the pickup arm 203 via the feeding gear 208, the connecting gear 2032 and the first transmission shaft 2031. In the flatbed scanner 21, the transmission gear set 212 thereof connects with the scanning gear 216, and is capable of transmitting the driving power coming from the first driving module 221. In addition, the transmission gear set 212 comprises a first bevel gear 2121 and a second bevel gear 2122, wherein the first bevel gear 2121 connects with the scanning gear 216 and rotates with the scanning gear 216 synchronously, while the second bevel gear 2122 engages with the first bevel gear 2121 and is brought to rotate by the first bevel gear 2121. Moreover, the transmission belt 213 connects with the second bevel gear 2122 and the scanning module 211, and is capable of being brought to move the scanning module 211 by the first bevel gear 2121, so as to enable the scanning module 211 to move along the moving shaft 217.

Referring to FIG. 5 as well, the first driving module 221 comprises a first driving element 2211, a first driving gear 2212 and a first transmitting gear 2213, wherein the first driving element 2211 is capable of rotating and thus providing the first driving power. In addition, the first driving gear 2212 connects with the first driving element 2211, and is capable of transmitting the first driving power coming from the first driving element 2211, while the first transmitting gear 2213 engages with the first driving gear 2212 and connects with the planet gear module 222, and is capable of outputting the first driving power to the planet gear module 222. Further, the first transmitting gear 2213 has a first rotating shaft 2213A, and is capable of connecting with the planet gear module 22. In the present preferred embodiment, the first driving element 2211 is a driving motor, and the first rotating shaft 2213A is integrally formed with the first transmitting gear 2213. Moreover, the first rotating direction C1 is the clockwise direction, and the second rotating direction C2 is the counterclockwise direction.

The planet gear module 222 comprises a swinging rod 2221, a sun gear 2222, a first planet gear 2223 and a second planet gear 2224, wherein the swinging rod 2221 connects with the first rotating shaft 2213A of the first transmitting gear 2213 and can be swung relative to the first rotating shaft 2213A. The sun gear 2222 is fitting onto the first rotating shaft 2213A, located at a side of the swinging rod 2221, and capable of rotating with the first rotating shaft 2213A synchronously. In addition, the first planet gear 2224 is disposed on the swinging rod 2221 and located at a side of the sun gear 2222 to engage with the sun gear 2222. Moreover, the first planet gear 2224 is capable of engaging with the scanning gear 216 or engaging with the feeding gear 208, and brought to transmit the driving power to the scanning gear 216 or to the feeding gear 208 by the sun gear 2222. The second planet gear 2224 is disposed on a second end of the swinging rod 2221 and located at another side of the sun gear 2222 to engage with the sun gear 2222. Further, the second planet gear 2224 is capable of contacting with the swinging module 223 and brought to rotate by the sun gear 2222, so as to enable the swinging rod 2221 to be swung toward the scanning gear 216 or to be swung toward the feeding gear 208.

The swinging module 223 comprises a shifting wedge 2231, an auxiliary post 2232 and a third elastic element 2233, wherein the shifting wedge 2231 is located near the second driving module 224, contacts with the second driving module 224, and is capable of being pushed to move by the second driving module 224. In addition, the auxiliary post 2232 is located near the shifting wedge 2231, and is capable of being pushed to contact with the planet gear module 222 by the shifting wedge 2231 being moved, wherein the auxiliary post 2232 has a plurality of sawtooth structures 2232A and a sliding groove 2232B. Moreover, the plurality of sawtooth structures 2232A is capable of engaging with the second planet gear 2224 of the planet gear module 222, while the sliding groove 2232B is disposed at a bottom of the auxiliary post 2232 and capable of combining with a sliding rail 218 of the flatbed scanner 21, so as to enable the auxiliary post 2232 to be pushed and thus to move. The swinging rod 2221 is capable of being swung relative to the first rotating shaft 2213A since the plurality of sawtooth structures 2232A engaging with the second planet gear 2224 and in response to the first driving power coming from the first driving module 221 when the plurality of sawtooth structures 2232A engages with the second planet gear 2224, so as to enable the planet gear 2223 to disengage with the scanning gear 216 or the feeding gear 208. The third elastic element 2233 connects with the auxiliary post 2232, and is capable of providing a third elastic force to the auxiliary post 2232, so as to enable the auxiliary post 2232 to be returned and thus to push the shifting wedge 2231, and then the shifting wedge 2231 is returned as well. In the present preferred embodiment, the third elastic element 2233 is a spiral spring.

The second driving module 224 comprises a second driving element 2241, a second driving gear 2242, a second transmitting gear 2243, a second rotating shaft 2244 and a second elastic element 2245. The second driving element 2241 is capable of rotating and thus providing the second driving power, while the second driving gear 2242 connects with the second driving element 2241, which is capable of transmitting the second driving power coming from the second driving element 2241. The second transmitting gear 2243 engages with the second driving gear 2242, and is capable of outputting the second driving power to the swinging module 223, while the second rotating shaft 2244 is adjacent to the shifting wedge 2231 of the swinging module 223, which is fitting into and thus connects with the second transmitting gear 2243, so as to synchronously rotate with the transmitting gear 2243. The second elastic element 2245 is fitting onto the second rotating shaft 2244 and contacts with the shifting wedge 2231, which is capable of providing a second elastic force to the shifting wedge 2231 in response to the second driving power. In addition, the shifting wedge 2231 is pushed to move, and the shifting wedge 2231 being moved pushes the auxiliary post 2232, so as to enable the auxiliary post 2232 to contact with the planet gear module 222. In the present preferred embodiment, the second elastic element 2245 is a torsion spring.

As illustrated in FIG. 5, the holding module 225 is disposed at a position near the swinging rod 2221 and contacts with a first end of the swinging rod 2221, and the holding module 225 comprises a holding rod 2251 and a first elastic element 2252, wherein the holding rod 2251 is capable of contacting with the swinging rod 2221 and holding the first end of the swinging rod 2221 therein. In addition, the holding rod 2251 has a first notch 2251A and a second notch 2251B, and the second notch 2251B is located under the first notch 2251A, wherein the first planet gear 2223 is kept engaging with the feeding gear 208 when the first end of the swinging rod 2221 inserts into the first notch 2251A and is held therein, so as to prevent the first planet gear 2223 from disengaging from the feeding gear 208 and thus to keep transmitting the driving power. Similarly, the first planet gear 2223 is kept engaging with the scanning gear 216 when the first end of the swinging rod 2221 inserts into the second notch 2251B and is held therein, so as to prevent the first planet gear 2223 from disengaging from the scanning gear 216 and thus to keep transmitting the driving power. The first elastic element 2252 connects with the holding rod 2251, and is capable of providing a first elastic force to the holding rod 2251, so as to enable the holding rod 2251 to be returned. In the present preferred embodiment, the first elastic element 2252 is a spiral spring.

The actual operation process of the power switching mechanism 22 is illustrated hereinafter. Referring to FIG. 4 and FIG. 5 together, FIG. 5 presents a case that the first planet gear 2223 of the power switching mechanism 22 engages with the scanning gear 216. In such a case, the first end of the swinging rod 2221 inserts into the second notch 2251B of the holding rod 2251 and is held therein, and the second planet gear 224 does not contact with the auxiliary post 2232 of the swinging module 223, i.e. the second planet gear 2224 does not engage with the plurality of sawtooth structures 2232A of the auxiliary post 2232. As the first driving element 2211 rotates along the first rotating direction C1 and the second driving element 2241 does not rotate, the first driving gear 2212 rotates along the first rotating direction C1 and thus brings both of the first transmitting gear 2213 and the first rotating shaft 2213A to rotate along the second rotating direction C2. At the same time, both of the sun gear 2222 and the first rotating shaft 2213A synchronously rotate along the second rotating direction C2, and thus bring the first planet gear 2223 to rotate along the first rotating direction C1. As a result, the scanning gear 216 is enabled to rotate along the second rotating direction C2, and both of the first bevel gear 2121 and the scanning gear 216 synchronously rotate along the second rotating direction C2 as well. In addition, the second bevel gear 2122 engaging with the first bevel gear 2121 is brought to rotate along the first rotating direction C1, and thus the transmission belt 213 is brought by the second bevel gear 2122, so as to bring the scanning module 211 to move along the moving shaft 217 toward the right side of FIG. 3. At the same time, the scanning module 211 scans the document S* along the scanning platform 215.

When the scanning module 211 completely scans the document S* and the first driving element 2211 is reversed and thus rotate along the second rotating direction C2, the second driving element 2241 keeps not rotating, while the first driving gear 2212 rotates along the second rotating direction C2 with the first driving element 2211 and thus brings both of the first transmitting gear 2213 and the first rotating shaft 2213A to rotate along the first rotating direction C1. At the same time, both of the sun gear 2222 and the first rotating shaft 2213A synchronously rotate along the first rotating direction C1, and thus brings the first planet gear 2223 to rotate along the second rotating direction C2, so as to enable the scanning gear 216 to rotate along the first rotating direction C1, and enable both of the first bevel gear 2121 and the scanning gear 216 to synchronously rotate along the first rotating direction C1. In addition, the second bevel gear 2122 engaging with the first bevel gear 2121 is brought to rotate along the second rotating direction C2, and thus the transmission belt 213 is brought by the second bevel gear 2122, so as to bring the scanning module 211 to move along the moving shaft 217 toward the left side of FIG. 3, i.e. the scanning module 211 is returned.

Figure 6:
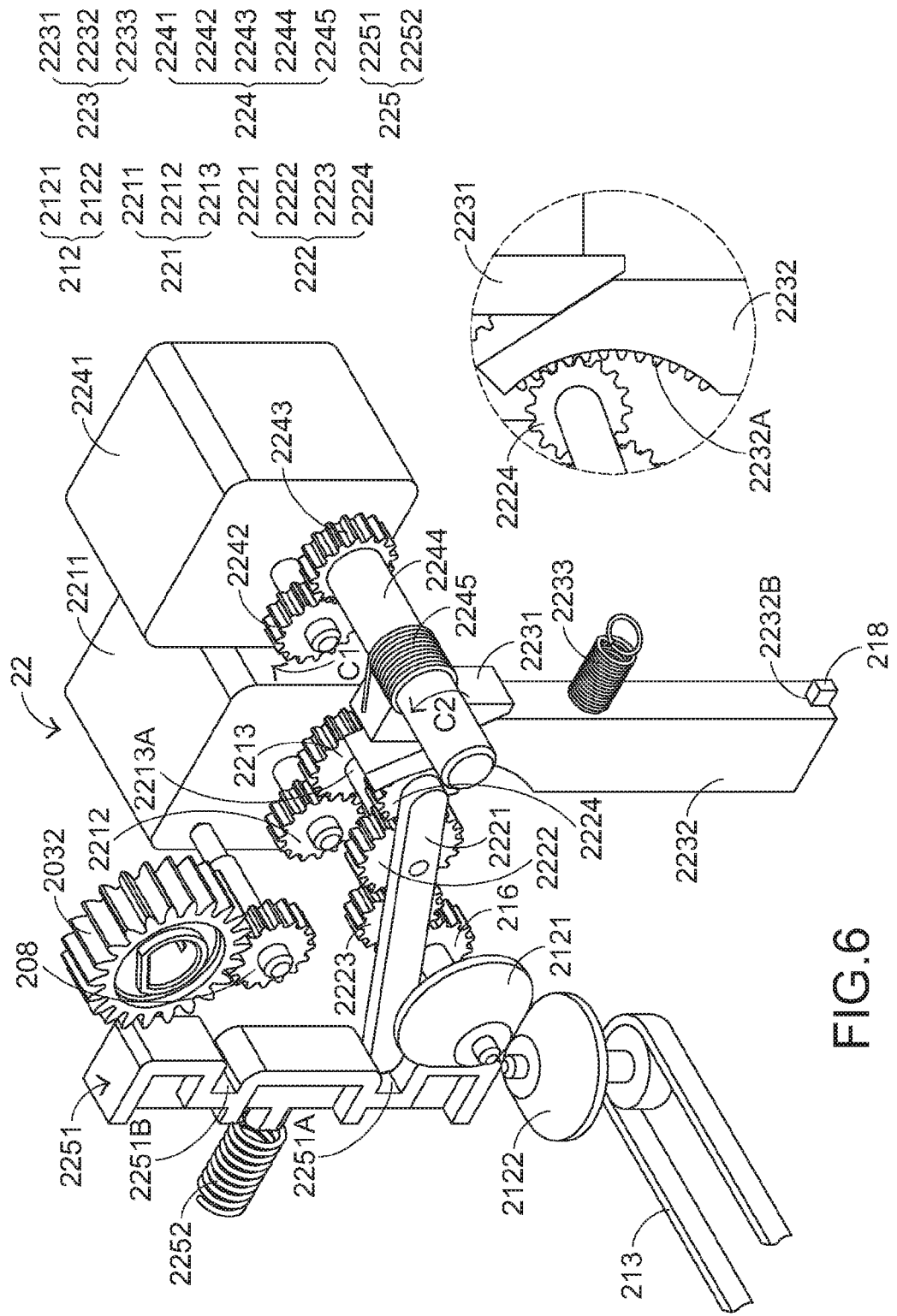
FIG. 6 illustrates a structural schematic view of a second driving module of an automatic document feeding scanning device according to a first preferred embodiment of the present invention, wherein the second driving module is pushing a swinging module.
Figure 7:
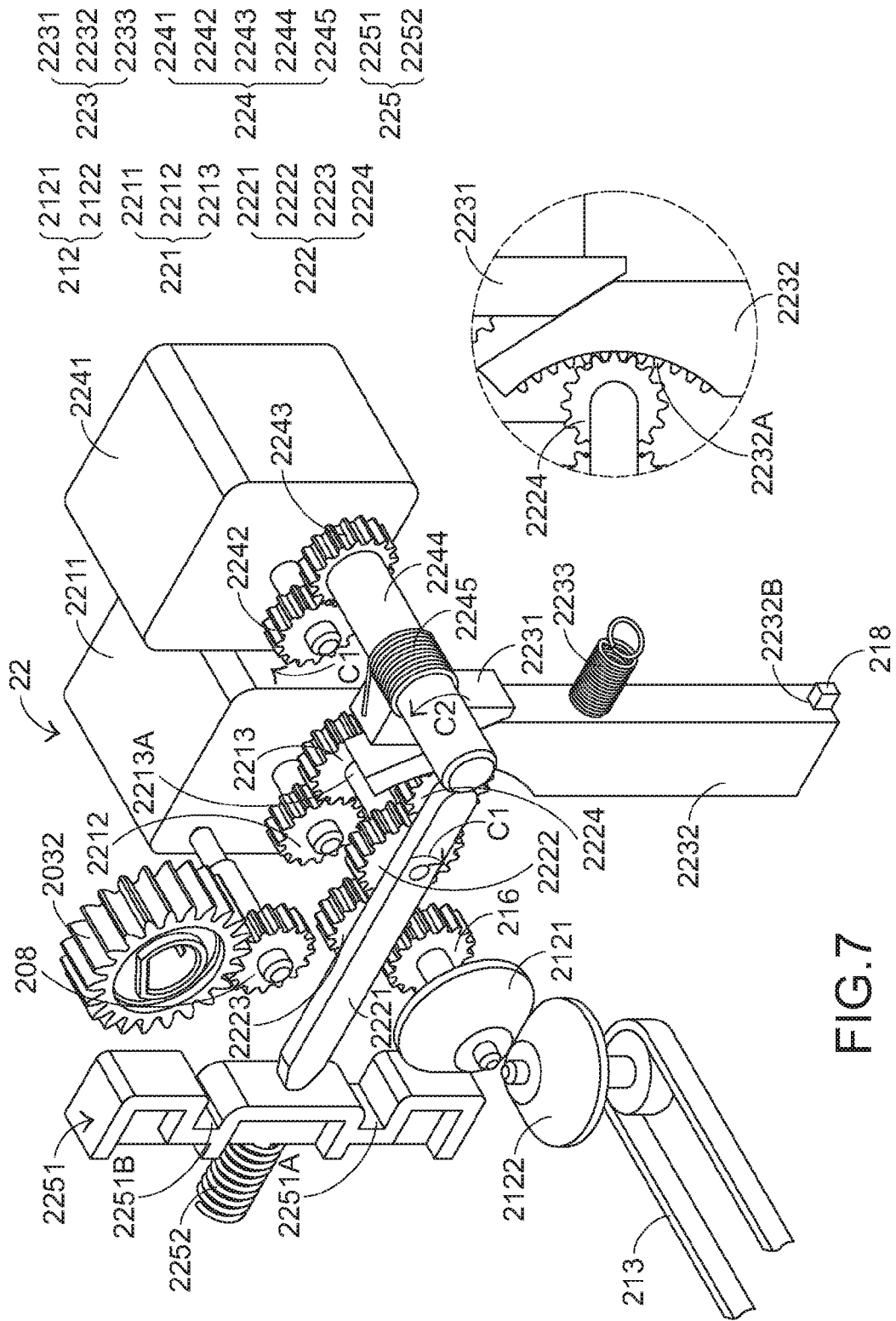
FIG. 7 illustrates a structural schematic view of a swinging rod of an automatic document feeding scanning device according to a first preferred embodiment of the present invention, wherein the swinging rod is swung toward a feeding gear.
Figure 8:
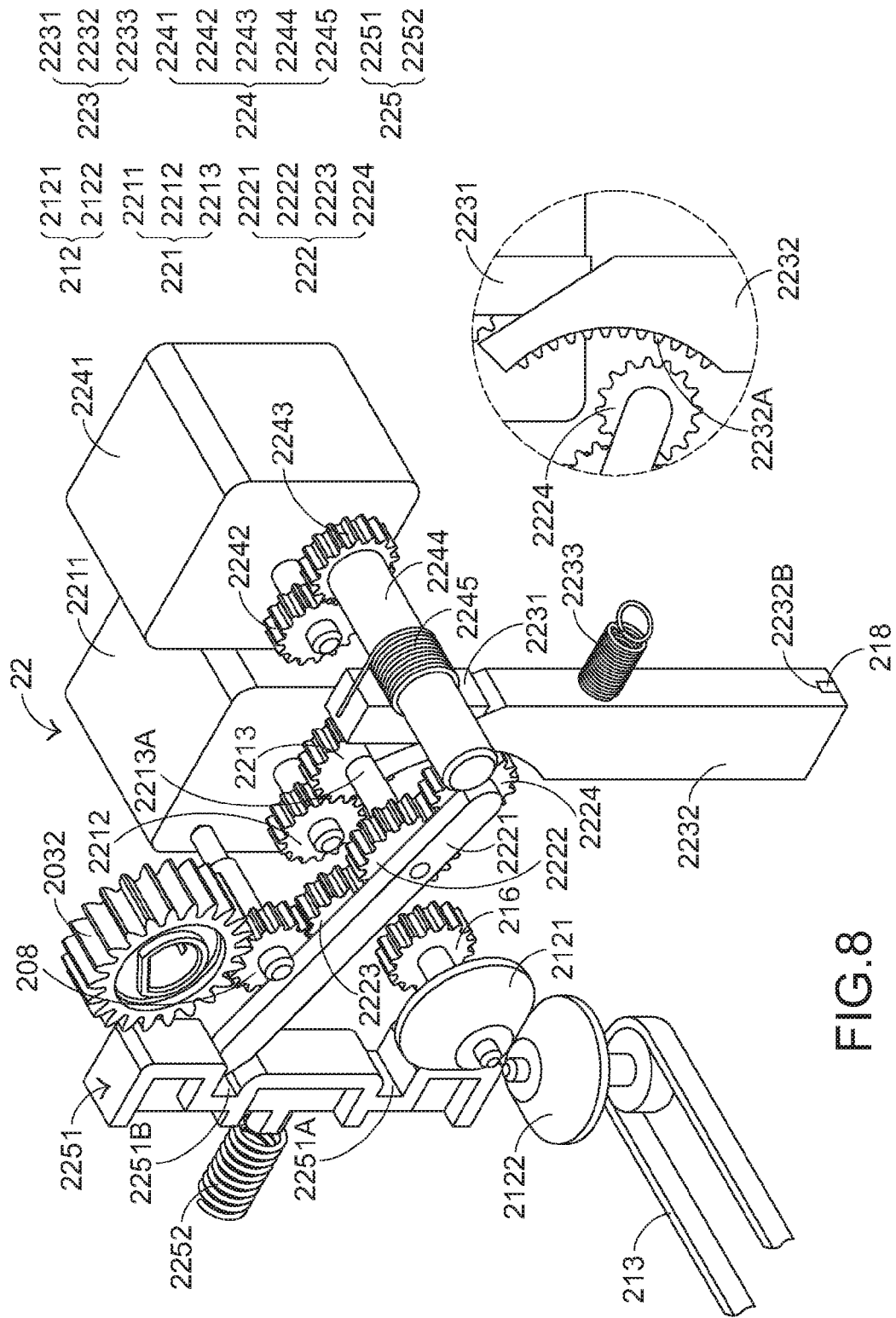
FIG. 8 illustrates a structural schematic view of a power switching mechanism of an automatic document feeding scanning device according to a first preferred embodiment of the present invention, wherein the power switching mechanism is connecting with a feeding gear.

FIG. 6 illustrates a structural schematic view of a second driving module of an automatic document feeding scanning device according to a first preferred embodiment of the present invention, wherein the second driving module is pushing a swinging module. In addition, FIG. 7 illustrates a structural schematic view of a swinging rod of an automatic document feeding scanning device according to a first preferred embodiment of the present invention, wherein the swinging rod is swung toward a feeding gear. Furthermore, FIG. 8 illustrates a structural schematic view of a power switching mechanism of an automatic document feeding scanning device according to a first preferred embodiment of the present invention, wherein the power switching mechanism is connecting with a feeding gear. Next, referring to FIG. 5 and FIG. 6 together, after the scanning module 211 is return, the first driving element 2211 stops to operate and the second driving element 2241 operates to rotate along the first rotating direction C1, so as to enable the second driving gear 2242 to be brought to rotate along the first rotating direction C1, and the transmitting gear 2243 is brought to rotate along the second rotating direction C2. At the same time, both of the second rotating shaft 2244 and the second transmitting gear 2243 synchronously rotate along the second rotating direction C2, and thus bring the second elastic element 2245 to push the shifting wedge 2231, so as to enable the shifting wedge 2231 to move. Next, the shifting wedge 2231 being moved pushes the auxiliary post 2232, so as to enable the sliding groove 2232B of the auxiliary post 2232 to move relative to the sliding rail 218, and enable the auxiliary post 2232 to contact with the planet gear module 222, wherein the plurality of sawtooth structures 2232A of the auxiliary post 2232 engages with the second planet gear 2224 of the planet gear module 222 as illustrated in FIG. 6.

The first driving element 2211 is operated again and thus rotates along the second rotating direction C2 after the plurality of sawtooth structures 2232A thereof engages with the second planet gear 2224, so as to enable the swinging rod 2221 to be swung relative to the first rotating shaft 2213A in response to not only the engagement between the plurality of sawtooth structures 2232A and the second planet gear 2224 but also the first driving power outputted by the first driving element 2211 as it rotates along the second rotating direction C2. In addition, the first end of the swinging rod 2221 is away from the second notch 2251B, wherein the first end of the swinging rod 2221 lightly pushes the holding rod 2251, so as to enable the holding rod 2251 to move and thus to compress the first elastic element 2252 to let the first elastic element 2252 gather the first elastic force. After the first end of the swinging rod 2221 is away from the second notch 2251B, the second planet gear 2224 correspondingly rotates along the second rotating direction C2 since the sun gear 2222 rotates along the first rotating direction C1, so as to enable the swinging rod 2221 to be swung toward the feeding gear 208. Moreover, the first end of the swinging rod 2221 keeps pushing the holding rod 2251, so as to enable the holding rod 2251 to move and thus to continuously compressing the first elastic element 2252 to let the first elastic element 2252 continuously gather the first elastic force as illustrated in FIG. 7.

When the swinging rod 2221 keeps being swung toward the feeding gear 208 and the first planet gear 2223 on the swinging rod 2221 engages with the feeding gear 208, the first end of the swinging rod 2221 moves to the front of the first notch 2251A of the holding rod 2251, and the first end of the swinging rod 2221 stops pushing the holding rod 2251, so as to enable the first elastic element 2252 to release the first elastic force to the holding rod 2251, and thus the holding rod 2251 is returned. At the same time, in response to the holding rod 2251 being returned, the first notch 2251A thereof encloses the first end of the swinging rod 2221, so as to enable the first end of the swinging rod 2221 to insert into the first notch 2251A and thus to hold the first end of the swinging rod 2221 within the first notch 2251A. As a result, the first driving power provided by the first driving module 221 is switched from transmitting to the flatbed scanner 21 into transmitting to the automatic document feeder 20 by the power switching mechanism 22.

After the first planet gear 2223 engages with the feeding gear 208 and the first end of the swinging rod 2221 inserts into the first notch, both of the first driving element 2211 and the second driving element 2241 stop rotating, so as to let all of the second driving gear 2242, the second transmitting gear 2243 and the second rotating shaft 2244 stop rotating, and thus the second elastic element 2245 stops pushing the shifting wedge 2231. At this time, the third elastic element 2233 provides the third elastic force to the auxiliary post 2232, so as to enable the sliding groove 2232B of the auxiliary post 2232 to be moved relative to the sliding rail 218, and thus the auxiliary post 2232 is returned. In addition, the auxiliary post 2232 being returned pushes the shifting wedge 2231, so as to enable the shifting wedge 2231 to be returned as well. As a result, the plurality of sawtooth structures 2232A of the auxiliary post 2232 stops engaging with the second planet gear 2224 as illustrated in FIG. 8.

In a case of the first planet gear 223 engaging with the feeding gear 208, the first driving element 2211 is operated and thus rotates along the first rotating direction C1, so as to enable the pickup arm 203 to be swung away from the top cover 204 relative to the top cover 204. Afterward, the pickup arm 203 contacts with the document S* located on the inlet tray 201, so as to feed the document S* into the feeding path 205 of the automatic document feeder 20. Next, the second driving element 2241 is operated and thus rotates along the second rotating direction C2, so as to enable the plurality of feeding roller sets 206 to rotate and thus to feed the document S* to move within the feeding path 205. In addition, when the document S* passes through the scanning window 214, the scanning module 211 scans the document S*.

Figure 9:
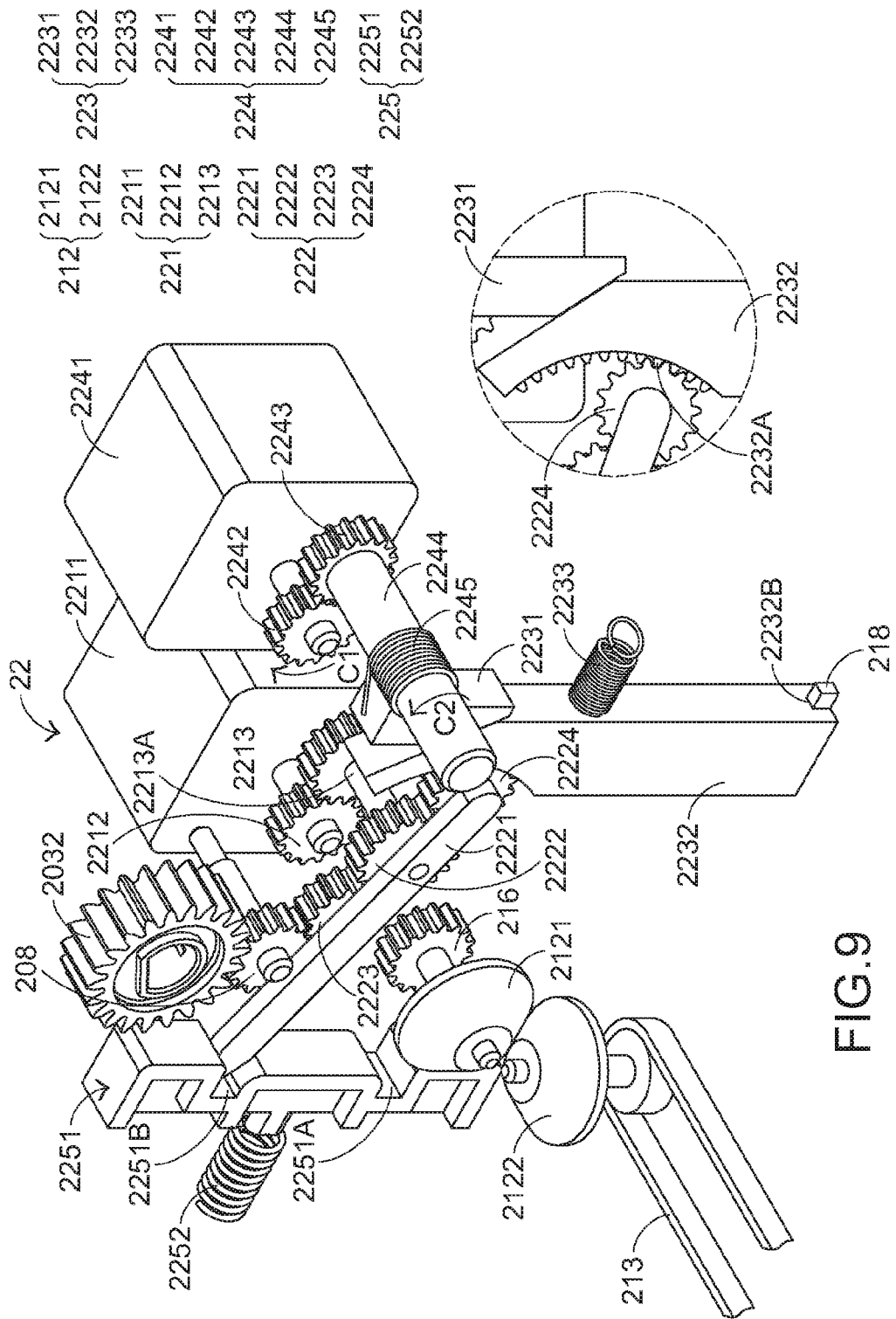
FIG. 9 illustrates a structural schematic view of a second driving module of an automatic document feeding scanning device according to a first preferred embodiment of the present invention, wherein the second driving module is pushing a swinging module.
Figure 10:
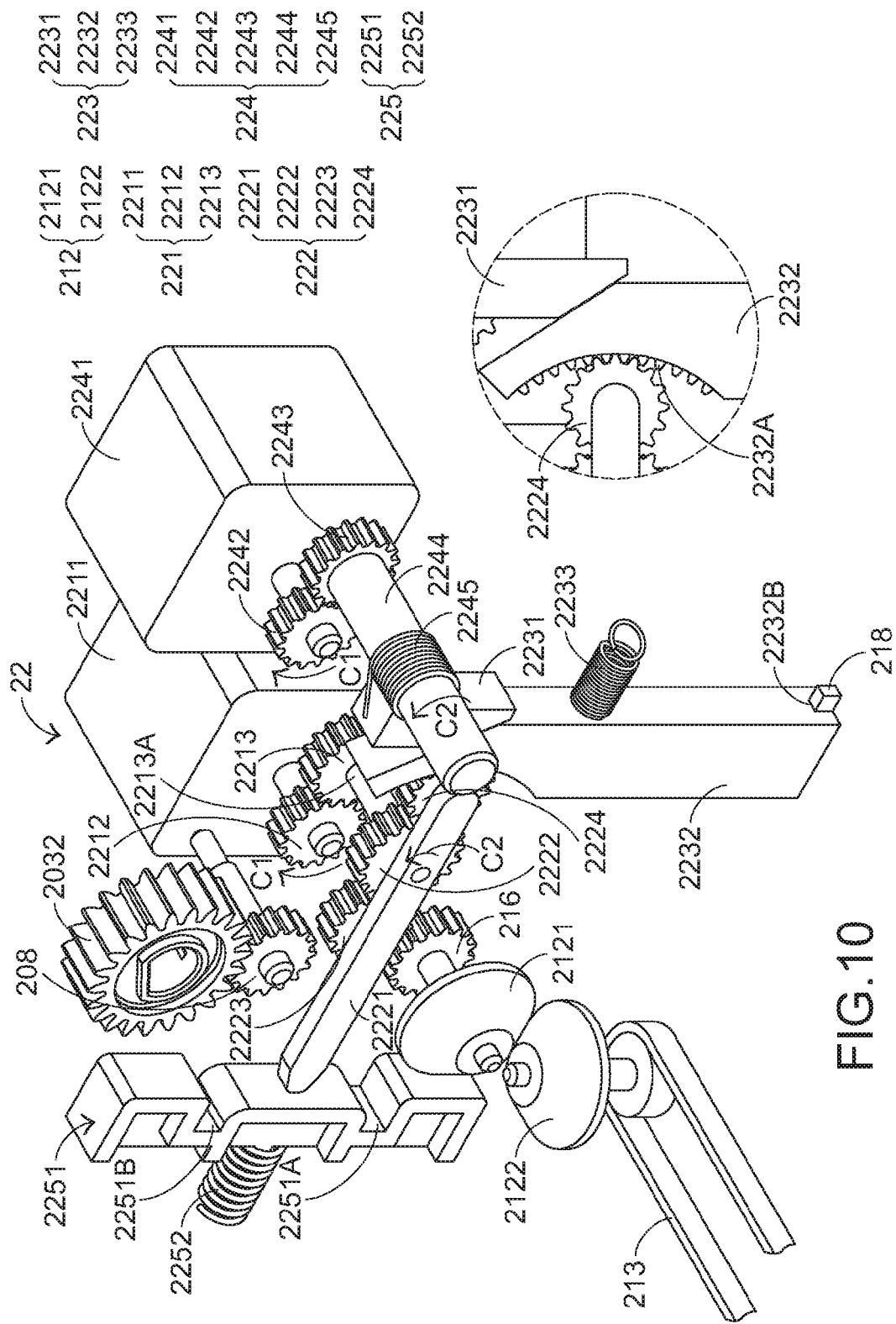
FIG. 10 illustrates a structural schematic view of a swinging rod of an automatic document feeding scanning device according to a first preferred embodiment of the present invention, wherein the swinging rod is swung toward a scanning gear.

FIG. 9 illustrates a structural schematic view of a second driving module of an automatic document feeding scanning device according to a first preferred embodiment of the present invention, wherein the second driving module is pushing a swinging module. In addition, FIG. 10 illustrates a structural schematic view of a swinging rod of an automatic document feeding scanning device according to a first preferred embodiment of the present invention, wherein the swinging rod is swung toward a scanning gear. Next, referring to FIG. 9, if the user desires to utilize the flatbed scanner 21 to scan the document after all of the picking up process of the pickup arm 203 and the feeding process of the plurality of feeding roller sets 206 are completed, the operation of the first driving element 2211 is stopped and the second driving element 2241 is reversed and thus rotates along the first rotating direction C1, so as to enable the second driving gear 2242 to be brought to rotate along the first rotating direction C1, and it also brings the second transmitting gear 2243 to rotate along the second rotating direction C2. At the same time, both of the second rotating shaft 2244 and the second transmitting gear 2243 synchronously rotate toward along the second rotating direction C2, and bring the second elastic element 2245 to push the shifting wedge 2231, so as to enable the shifting wedge 2231 to move. Next, the shifting wedge 2231 being moved pushes the auxiliary post 2232, so as to enable the sliding groove 2232B of the auxiliary post 2232 to move relative to the sliding rail 218, and to enable the auxiliary post 2232 to contact with the planet gear module 222, wherein the plurality of sawtooth structures 2232A of the auxiliary post 2232 engages with the second planet gear 2224 of the planet gear module 222.

After the plurality of sawtooth structures 2232A thereof engages with the second planet gear 2224, the first driving element 2211 is operated again to rotate along the first rotating direction C1, and thus the swinging rod 2221 is capable of being swung relative to the first rotating shaft 2213A in response to not only the engagement between the plurality of sawtooth structures 2232A and the second planet gear 2224 but also the first driving power outputted by the first driving element 2211 as it rotates along the first rotating direction C1. In addition, the first end of the swinging rod 2221 is away from the first notch 2251A, wherein the first end of the swinging rod 2221 lightly pushes the holding rod 2251, so as to enable the holding rod 2251 to move and thus to compress the first elastic element 2252 to let the first elastic element 2252 gather the first elastic force. After the first end of the swinging rod 2221 is away from the second notch 2251B, the second planet gear 2224 correspondingly rotates along the first rotating direction C1 since the sun gear 2222 rotates along the second rotating direction C2, so as to enable the swinging rod 2221 to be swung toward the scanning gear 216. Moreover, the first end of the swinging rod 2221 keeps pushing the holding rod 2251, so as to enable the holding rod 2251 to move and thus to continuously compressing the first elastic element 2252 to let the first elastic element 2252 continuously gather the first elastic force as illustrated in FIG. 10.

When the swinging rod 2221 keeps being swung toward the scanning gear 216 and the first planet gear 2223 on the swinging rod 2221 engages with the scanning gear 216, the first end of the swinging rod 2221 moves to the front of the second notch 2251B of the holding rod 2251, and the first end of the swinging rod 2221 stops pushing the holding rod 2251, so as to enable the first elastic element 2252 to release the first elastic force to the holding rod 2251, and thus the holding rod 2251 is returned. At the same time, in response to the holding rod 2251 being returned, the second notch 2251B thereof encloses the first end of the swinging rod 2221, so as to enable the first end of the swinging rod 2221 to insert into the second notch 2251B and thus to hold the first end of the swinging rod 2221 within the second notch 2251B.

Afterward, the second driving element 2241 stop rotating, so as to let all of the second driving gear 2242, the second transmitting gear 2243 and the second rotating shaft 2244 stop rotating, and thus the second elastic element 2245 stops pushing the shifting wedge 2231. At this time, the third elastic element 2233 provides the third elastic force to the auxiliary post 2232, so as to enable the sliding groove 2232B of the auxiliary post 2232 to be moved relative to the sliding rail 218, and thus the auxiliary post 2232 is returned. In addition, the auxiliary post 2232 being returned pushes the shifting wedge 2231, so as to enable the shifting wedge 2231 to be returned as well. As a result, the plurality of sawtooth structures 2232A of the auxiliary post 2232 stops engaging with the second planet gear 2224 as illustrated in FIG. 5. As a result, the first driving power provided by the first driving module 221 is switched from transmitting to the automatic document feeder 20 into transmitting to the flatbed scanner 21 by the power switching mechanism 22, wherein the scanning process processed by the flatbed scanner 21 is substantially the same as the foregoing description and is omitted herein.

Figure 11:
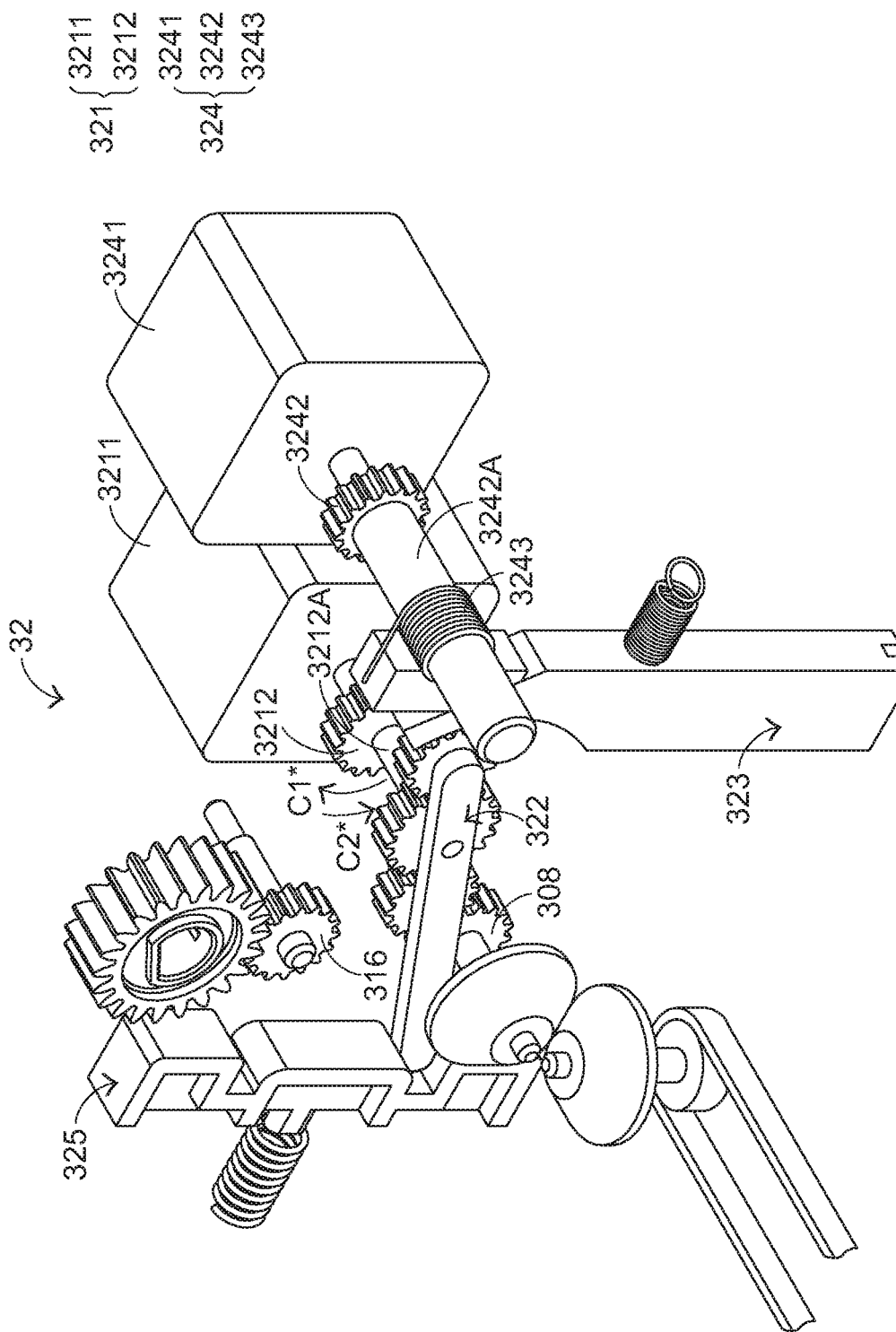
FIG. 11 illustrates a structural schematic view of a power switching mechanism of an automatic document feeding scanning device according to a second preferred embodiment of the present invention, wherein the power switching mechanism is transmitting a first driving power to a flatbed scanner.

In addition, the present invention further provides a second preferred embodiment. FIG. 11 illustrates a structural schematic view of a power switching mechanism of an automatic document feeding scanning device according to a second preferred embodiment of the present invention, wherein the power switching mechanism is transmitting a first driving power to a flatbed scanner. Referring to FIG. 11, it presents a feeding gear 308 of an automatic document feeder (not shown), a scanning gear 316 of a flatbed scanner (not shown) and a power switching mechanism 32, wherein the power switching mechanism 32 comprises a first driving module 321, a planet gear module 322, a swinging module 323, a second driving module 324 and a holding module 325. The structures of the planet gear module 322, the swinging module 323 and the holding module 325 of the present preferred embodiment are all substantially the same as those of the first preferred embodiment and are omitted herein, while the differences between the present preferred embodiment and the first preferred embodiment are the structures of the first driving module 321 and the second driving module 324.

The first driving module 321 comprises a first driving element 3211 and a first driving gear 3212, wherein the first driving element 3211 is capable of rotating and thus providing a first driving power, and the first driving gear 3212 connects with the first driving element 3211 and is capable of transmitting the first driving power coming from the first driving element 3211. In addition, the first driving gear 3212 has a first rotating shaft 3212A and is capable of connecting with the planet gear module 322. Furthermore, the second driving module 324 comprises a second driving element

3241, a second driving gear 3242 and a second elastic element 3243. Herein, the second driving element 3241 is capable of rotating and thus providing the second driving power. Moreover, the second driving gear 3242 connects with the second driving element 3241, which is capable of transmitting the second driving power coming from the second driving element 3241. In addition, the second driving gear 3242 has a second rotating shaft 3242A, and the second rotating shaft 3242A is formed by extending from the second driving gear 3242, so as to enable the second rotating shaft 3242A to synchronously rotate with the second driving gear 3242. Besides, the second elastic element 3243 is fitting onto the second rotating shaft 3242A and contacts with a shifting wedge 3231 of the swinging module 323, and is capable of providing a second elastic force to the shifting wedge 3231 in response to the second driving power. Furthermore, the shifting wedge 3231 is pushed to move, and the shifting wedge 3231 being moved pushes an auxiliary post 3232 of the swinging module 323, so as to enable the auxiliary post 3232 to contact with the planet gear module 322. In the present preferred embodiment, the second rotating shaft 3242A and the second driving gear 3242 are formed integrally.

Based upon the structures of the first driving module 321 and the second driving module 324 illustrated above, it should be understood that the planet gear module 322 is swung toward the scanning gear 308 and engages with the scanning gear 308 when the first driving element 3211 rotate along a first rotating direction C1* and the second driving element 3241 rotate along a second rotating direction C2*. In contrast, the planet gear module 322 is swung toward the feeding gear 316 and engages with the feeding gear 316 when the first driving element 3211 rotate along the second rotating direction C2* and the second driving element 3241 rotate along the second rotating direction C2*.

According to the foregoing illustrations, it should be understood that the automatic document feeding scanning device of the present invention is disposed with two driving elements used for transmitting the driving power to the automatic document feeder or the flatbed scanner based upon the control of the power switching mechanism. In detail, the planet gear module is away from the holding module and swung toward the scanning gear and thus engages with the scanning gear as both of the two driving elements rotate along the same rotating direction, so as to enable the power switching mechanism to transmit the driving power to the flatbed scanner. In contrast, the planet gear module is away from the holding module and swung toward the feeding gear and thus engages with the feeding gear as the two driving elements rotate along different rotating directions, so as to enable the power switching mechanism to transmit the driving power to the automatic document feeder. And vice versa is the same as well, i.e. the planet gear module is away from the holding module and swung toward the scanning gear and thus engages with the scanning gear as the two driving elements rotate along different rotating directions, so as to enable the power switching mechanism to transmit the driving power to the flatbed scanner. In contrast, the planet gear module is away from the holding module and swung toward the feeding gear and thus engages with the feeding gear as both of the two driving elements rotate along the same rotating direction, so as to enable the power switching mechanism to transmit the driving power to the automatic document feeder.

In another word, the automatic document feeding scanning device of the present invention can provide the driving power to the automatic document feeder or the flatbed scanner by varying the operation of two driving element. As a result, in contrast to the prior art, the present invention can not only reduce the purchase cost but also consume less power by using fewer driving elements. Certainly, the overall volume of the automatic document feeding scanning device of the present invention can be reduced as well since the requirement of the internal space of the automatic document feeding scanning device is decreased by disposing fewer driving elements therein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An automatic document feeding scanning device, capable of scanning a document, wherein the automatic document feeding scanning device comprises:
   an automatic document feeder, capable of feeding the document, wherein the automatic document feeder has a feeding gear;
   a flatbed scanner, disposed under the automatic document feeder, and capable of scanning the document, wherein the flatbed scanner has a scanning gear; and
   a power switching mechanism, disposed at a position near the automatic document feeder and the flatbed scanner, and capable of transmitting a first driving power to the automatic document feeder or transmitting the first driving power to the flatbed scanner, wherein the power switching mechanism comprises:
   a first driving module, capable of providing the first driving power and outputting the first driving power, wherein the first driving module comprises a first driving element capable of rotating and thus providing the first driving power;
   a planet gear module, connecting with the first driving module, and capable of engaging with the feeding gear and thus transmitting the first driving power to the automatic document feeder, or engaging with the scanning gear and thus transmitting the first driving power to the flatbed scanner;
   a swinging module, near the planet gear module, and capable of assisting the planet gear module in being swung toward the feeding gear or being swung toward the scanning gear when the swinging module contacts with the planet gear module; and
   a second driving module, connecting with the swinging module, capable of transmitting a second driving power to the swinging module, so as to enable the swinging module to contact with the planet gear module, and the second driving module comprises a second driving element capable of rotating and thus providing the second driving power; wherein the planet gear module is swung toward the scanning gear and engages with the scanning gear when the first driving element rotates along a first rotating direction and the second driving element rotates along the first rotating direction; while the planet gear module is swung toward the feeding gear and engages with the feeding gear when the first driving element rotates along a second rotating direction opposite to the first rotating direction and the second driving element rotates along the first rotating direction.

2. The automatic document feeding scanning device as claimed in claim 1, wherein the first driving module further comprises:

a first driving gear, connecting with the first driving element, and capable of transmitting the first driving power coming from the first driving element; and a first transmitting gear, engaging with the first driving gear, connecting with the planet gear module, and capable of transmitting the first driving power to the planet gear module; wherein the first driving gear rotates along the first rotating direction with the first driving element and the first transmitting gear rotates along the second rotating direction when the first driving element rotates along the first rotating direction; while the first driving gear rotates along the second rotating direction with the first driving element and the first transmitting gear rotates along the first rotating direction when the first driving element rotates along the second rotating direction.

3. The automatic document feeding scanning device as claimed in claim 2, wherein the automatic document feeder further comprises a pickup arm, a top cover and at least one feeding roller set, the pickup arm connects with the feeding gear and capable of being driven by the first driving module, so as to enable the pickup arm to feed the document into the automatic document feeder or to be swung relative to the top cover, the top cover is disposed over the pickup arm, while the at least one feeding roller set connects with the second driving module and capable of being driven by the second driving module, so as to feed the document to be moved within the automatic document feeder, the flatbed scanner further comprises a scanning module, the scanning module connects with the scanning gear and capable of being driven by the first driving module, so as to enable the scanning module to move and to scan the document; the pickup arm feeds the document into the automatic document feeder when the planet gear module engages with the feeding gear and the first driving element rotates along the first rotating direction; while the pickup arm is swung toward the top cover when the planet gear module engages with the feeding gear and the first driving element rotates along the second rotating direction; the scanning module moves away from the scanning gear and scans the document when the planet gear module engages with the scanning gear and the first driving element rotates along the first rotating direction; while the scanning module moves close to the scanning gear when the planet gear module engages with the scanning gear and the first driving element rotates along the second rotating direction.

4. The automatic document feeding scanning device as claimed in claim 3, wherein the pickup arm further comprises a first transmission shaft connecting with the feeding gear, so as to enable the first driving power to be transmitted to the pickup arm via the feeding gear and the first transmission shaft.

5. The automatic document feeding scanning device as claimed in claim 3, wherein the flatbed scanner further comprises:

a first bevel gear, connecting with the scanning gear and synchronously rotating with the scanning gear;

a second bevel gear, engaging with the first bevel gear and brought to rotate by the first bevel gear; and a transmission belt, connecting with the second bevel gear and the scanning module, and capable of being brought to move the scanning module by the first bevel gear.

6. The automatic document feeding scanning device as claimed in claim 2, wherein the planet gear module comprises:

a swinging rod, connecting with a rotating shaft of the first transmitting gear and capable of being swung relative to the rotating shaft;

a sun gear, fitting onto the rotating shaft and located at a side of the swinging rod, and capable of synchronously rotating with the rotating shaft;

a first planet gear, disposed on the swinging rod and located at a side of the sun gear, so as to engage with the sun gear, capable of engaging with the scanning gear or engaging with the feeding gear, and brought to transmit the first driving power to the scanning gear or the feeding gear by the sun gear; and a second planet gear, disposed on a second end of the swinging rod and located at another side of the sun gear, so as to engage with the sun gear, capable of contacting with the swinging module, and brought to enable the swinging rod to be swung toward the feeding gear or to be swung toward the scanning gear by the sun gear.

7. The automatic document feeding scanning device as claimed in claim 1, wherein the planet gear module comprises:

a swinging rod, connecting with the first driving module and capable of being swung relative to the first driving module;

a sun gear, connecting with first driving module and located at a side of the swinging rod, and capable of being rotated in response to the first driving power;

a first planet gear, disposed on the swinging rod and located at a side of the sun gear, so as to engage with the sun gear, capable of engaging with the scanning gear or engaging with the feeding gear, and brought to transmit the first driving power to the scanning gear or the feeding gear by the sun gear; and a second planet gear, disposed on a second end of the swinging rod and located at another side of the sun gear, so as to engage with the sun gear, capable of contacting with the swinging module, and brought to enable the swinging rod to be swung toward the feeding gear or to be swung toward the scanning gear by the sun gear.

8. The automatic document feeding scanning device as claimed in claim 7, wherein the power switching mechanism further comprises a holding module disposed at a position near the swinging rod and contacting with a first end of the swinging rod, and the holding module comprises:

a holding rod, capable of contacting with the swinging rod and holding the first end of the swinging rod therein, wherein the holding rod has a first notch and a second notch located under the first notch, the first planet gear is kept engaging with the feeding gear when the first end of the swinging rod inserts into the first notch and is held therein, while the first planet gear is kept engaging with the scanning gear when the first end of the swinging rod inserts into the second notch and is held therein; and a first elastic element, connecting with the holding rod, and capable of providing a first elastic force to the holding rod, so as to enable the holding rod to be returned.

9. The automatic document feeding scanning device as claimed in claim 8, wherein the swinging rod is swung toward the scanning gear relative to the first driving module and the first end of the swinging rod pushes the holding rod and is away from the first notch when the first driving element rotates along the first rotating direction and the second driving element rotates along the second rotating direction; while the swinging rod is swung toward the feeding gear relative to the first driving module and the first end of the swinging rod pushes the holding rod and is away from the second notch when the first driving element rotates along the second rotating direction and the second driving element rotates along the second rotating direction.

10. The automatic document feeding scanning device as claimed in claim 1, wherein the second driving module further comprises:
  a second driving gear, connecting with the second driving element, and capable of transmitting the second driving power coming from the second driving element;
  a second transmitting gear, engaging with the second driving gear, and capable of outputting the second driving power to the swinging module;
  a second rotating shaft, adjacent to the swinging module, and connecting with the second transmitting gear, so as to synchronously rotate with the second transmitting gear; and
  a second elastic element, fitting onto the second rotating shaft and contacting with the swinging module, and capable of providing a second elastic force to the swinging module in response to the second driving power, so as to enable the swinging module to be pushed and thus to contact with the planet gear module.

11. The automatic document feeding scanning device as claimed in claim 1, wherein the swinging module comprises:
  a shifting wedge, near the second driving module and contacting with the second driving module, and capable of being pushed to move by the second driving module;
  an auxiliary post, near the shifting wedge, and capable of being pushed to contact with the planet gear module by the shifting wedge being moved, wherein the auxiliary post has a plurality of sawtooth structures capable of engaging with a second planet gear of the planet gear module; and
  a third elastic element, connecting with the auxiliary post, and capable of providing a third elastic force to the auxiliary post, so as to enable the auxiliary post to be returned to push the shifting wedge, and thus the shifting wedge is returned.

12. An automatic document feeding scanning device, capable of scanning a document, wherein the automatic document feeding scanning device comprises:
  an automatic document feeder, capable of feeding the document, wherein the automatic document feeder has a feeding gear;
  a flatbed scanner, disposed under the automatic document feeder, and capable of scanning the document, wherein the flatbed scanner has a scanning gear; and
  a power switching mechanism, disposed at a position near the automatic document feeder and the flatbed scanner, and capable of transmitting a first driving power to the automatic document feeder or transmitting the first driving power to the flatbed scanner, wherein the power switching mechanism comprises:
    a first driving module, capable of providing the first driving power and outputting the first driving power, wherein the first driving module comprises a first driving element capable of rotating and thus providing the first driving power;
    a planet gear module, connecting with the first driving module, and capable of engaging with the feeding gear and thus transmitting the first driving power to the automatic document feeder, or engaging with the scanning gear and thus transmitting the first driving power to the flatbed scanner;
    a swinging module, near the planet gear module, and capable of assisting the planet gear module in being swung toward the feeding gear or being swung toward the scanning gear when the swinging module contacts with the planet gear module; and
    a second driving module, connecting with the swinging module, capable of transmitting a second driving power to the swinging module, so as to enable the swinging module to contact with the planet gear module, and the second driving module comprises a second driving element capable of rotating and thus providing the second driving power; wherein the planet gear module is swung toward the scanning gear and engages with the scanning gear when the first driving element rotates along a first rotating direction and the second driving element rotates along a second rotating direction opposite to the first rotating direction; while the planet gear module is swung toward the feeding gear and engages with the feeding gear when the first driving element rotates along the second rotating direction and the second driving element rotates along the second rotating direction.

13. The automatic document feeding scanning device as claimed in claim 12, wherein the first driving module further comprises a first driving gear connecting with the first driving element, and capable of transmitting the first driving power coming from the first driving element; wherein the first driving gear rotates along the first rotating direction with the first driving element when the first driving element rotates along the first rotating direction; while the first driving gear rotates along the second rotating direction with the first driving element when the first driving element rotates along the second rotating direction.

14. The automatic document feeding scanning device as claimed in claim 12, wherein the planet gear module comprises:
  a swinging rod, connecting with the driving module and capable of being swung relative to the first driving module;
  a sun gear, connecting with the first driving module and located at a side of the swinging rod, and capable of rotating in response to the first driving power;
  a first planet gear, disposed on the swinging rod and located at a side of the sun gear, so as to engage with the sun gear, capable of engaging with the scanning gear or engaging with the feeding gear, and brought to transmit the first driving power to the scanning gear or the feeding gear by the sun gear; and
  a second planet gear, disposed on a second end of the swinging rod and located at another side of the sun gear, so as to engage with the sun gear, capable of contacting with the swinging module, and brought to enable the swinging rod to be swung toward the feeding gear or to be swung toward the scanning gear by the sun gear.

15. The automatic document feeding scanning device as claimed in claim 14, wherein the power switching mechanism further comprises a holding module disposed at a position near the swinging rod and contacting with a first end of the swinging rod, and the holding module comprises:
  a holding rod, capable of contacting with the swinging rod and holding the first end of the swinging rod therein, wherein the holding rod has a first notch and a second notch located under the first notch, the first planet gear is kept engaging with the feeding gear when the first end of the swinging rod inserts into the first notch and is held therein, while the first planet gear is kept engaging with the scanning gear when the first end of the swinging rod inserts into the second notch and is held therein; and
  a first elastic element, connecting with the holding rod, and capable of providing a first elastic force to the holding rod, so as to enable the holding rod to be returned.

16. The automatic document feeding scanning device as claimed in claim 12, wherein the second driving module further comprises:
- a second driving gear, connecting with the second driving element, and capable of transmitting the second driving power coming from the second driving element;
- a second rotating shaft, adjacent to the swinging module, and connecting with the second driving gear, so as to synchronously rotate with the second driving gear; and
- a second elastic element, fitting onto the second rotating shaft and contacting with the swinging module, and capable of providing a second elastic force to the swinging module in response to the second driving power, so as to enable the swinging module to be pushed and thus to contact with the planet gear module.

17. The automatic document feeding scanning device as claimed in claim 12, wherein the swinging module comprises:
- a shifting wedge, near the second driving module and contacting with the second driving module, and capable of being pushed to move by the second driving module;
- an auxiliary post, near the shifting wedge, and capable of being pushed to contact with the planet gear module by the shifting wedge being moved, wherein the auxiliary post has a plurality of sawtooth structures capable of engaging with a second planet gear of the planet gear module; and
- a third elastic element, connecting with the auxiliary post, and capable of providing a third elastic force to the auxiliary post, so as to enable the auxiliary post to be returned to push the shifting wedge, and thus the shifting wedge is returned.

* * * * *